Patented Jan. 27, 1942

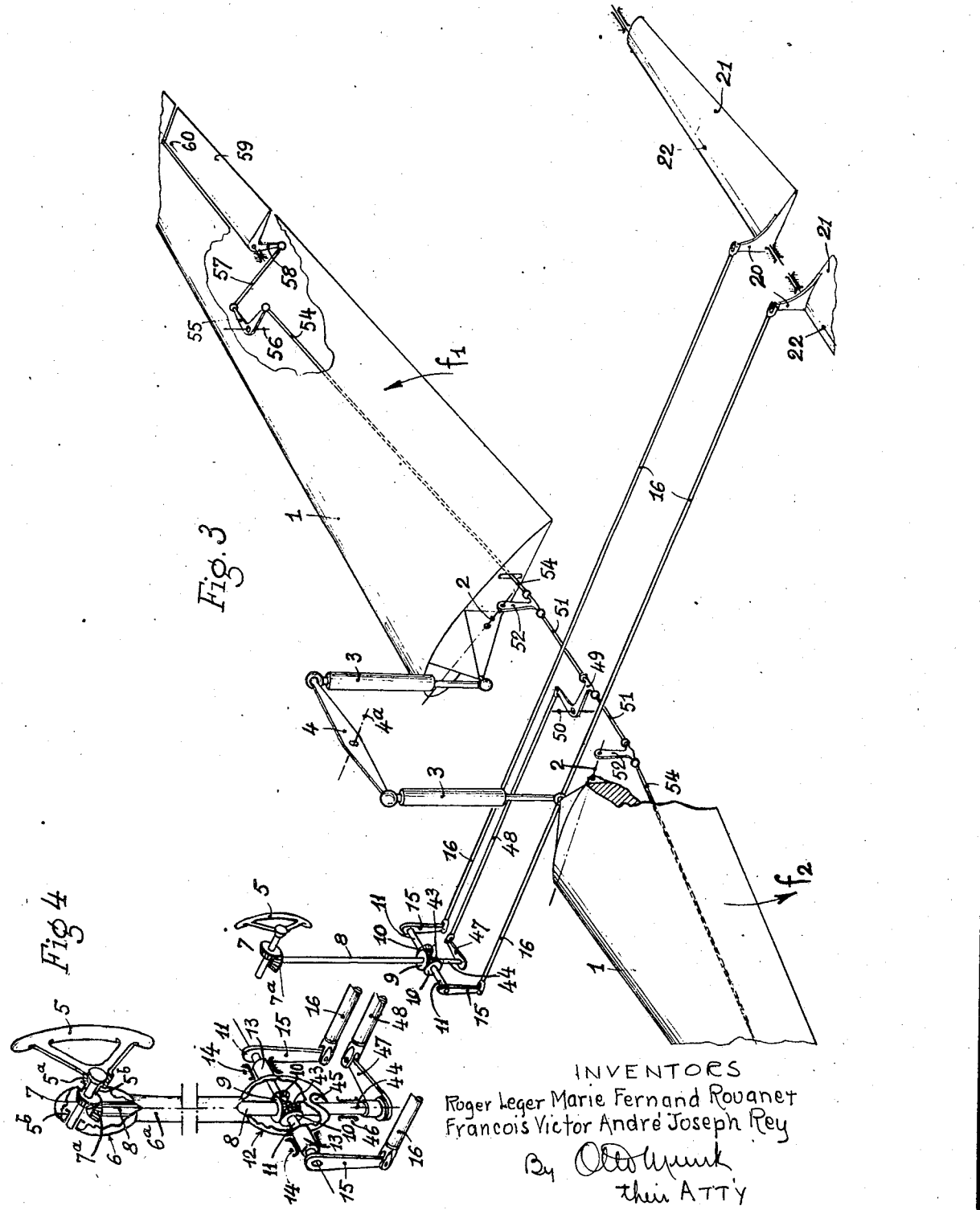

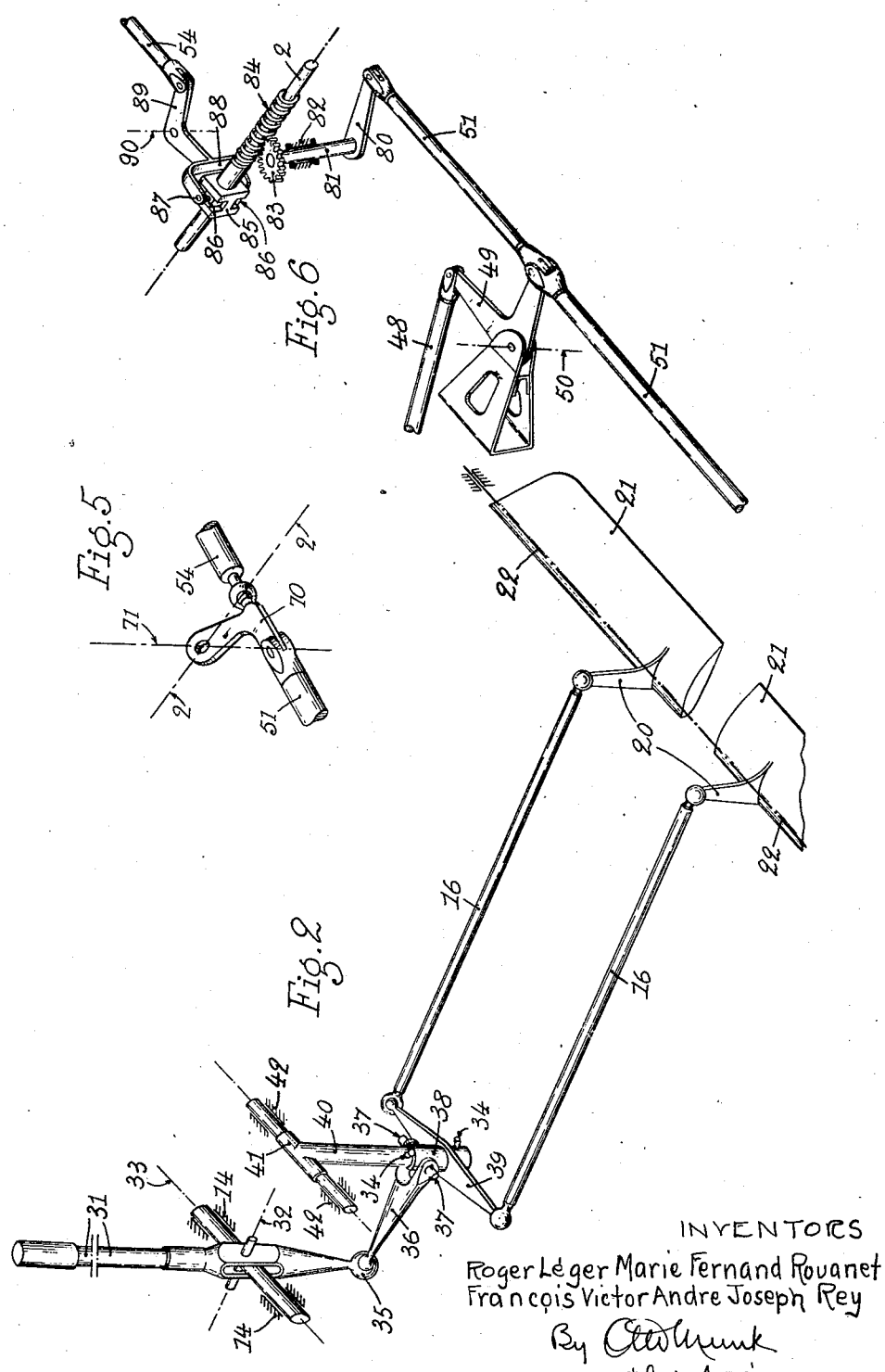

2,271,509

UNITED STATES PATENT OFFICE 2,271,509

LATERAL CONTROL MEANS FOR FLYING MACHINES WITH PIVOTED WINGS

Roger Léger Marie Fernand Rouanet and François Victor André Joseph Rey, Paris, France Application April 8, 1939, Serial No. 266,810 In France April 12, 1938

10 Claims. (Cl. 244—83)

The present invention has for its object to provide a new method for the control of the lateral movements (lateral inclinations) of flying machines in which each wing is hinged to the central body of the machine about an axis which is oblique to the plane of symmetry of the machine.

The invention further consists of a flying machine with hingedly mounted wings which is improved in view of carrying into effect said method.

It is a known fact that in such flying machines the rotation of each wing about its pivot axis will cause, by reason of the oblique direction of said axis, a variation of the incidence of this wing with reference to the relative wind, and hence a variation of the aerodynamic forces which it supports. In consequence, it is possible to effect the lateral control of such machines by acting directly or indirectly upon the wings themselves in order to turn each wing about its pivot axis in such a way as to obtain a differential rotation (a different incidence of the wings located and either side of the central body with reference to the relative wind) which causes unsymmetrical aerodynamic actions and hence a rolling moment.

The invention has for its object to otherwise provide for the lateral movements of such machines. The method according to the invention consists in utilizing, for this purpose, the differential deflection of the movable flaps forming the elevator, which flaps, on the usual machines, are employed only to obtain, by their simultaneous deflection in the same direction, the longitudinal inclination ("nose-down" or "climb") of the machine.

According to a further characteristic, this action of differential deflection of the elevator flaps is combined with a differential deflection of movable flaps (ailerons) mounted on the wings, which ailerons may either not be affected by the rotation of the wings on their pivot axes, and in this case be exclusively controlled by the pilot (controlled differential action of the ailerons), or they may be affected by the rotation of the wings on their pivot axes (automatic differential action), and at the same time they may be controlled by the pilot if desired.

The flying machine with hingedly mounted wings for carrying into effect said method is characterized by the fact that the movable flaps forming the elevator are connected with the control member (control stick, control wheel or the like) in such a manner that by acting on the said member the pilot can impart to the said flaps either differential movements of rotation for producing a rolling moment providing for the lateral inclination of the machine, or equal movements of rotation in the same direction for producing a pitching moment providing for the longitudinal inclination of the machine or different movements of rotation in the same direction in order to obtain a lateral inclination as well as a longitudinal inclination of the machine.

According to a further characteristic, when said roll and pitch control flaps are combined with ailerons carried by the wings, the controlling mechanism is so arranged that the said ailerons will be given a differential deflection at the same time as the pitch and roll control flaps, while the control of the flaps in the same direction, for a vertical movement of the machine (nose-down or climb of the machine) will have no effect upon the ailerons.

In the accompanying drawings, which are given solely by way of example:

Fig. 2 is a like view of a modification.

Fig. 3 is a perspective view of the whole device for the control of the elevator flaps and the ailerons, in the case in which the rotation of each wing on its pivot axis will automatically modify the deflection of the corresponding aileron with reference to the wing.

Fig. 4 is a view on a larger scale, of the control column.

Fig. 5 is a detail view of a part of the control gear of an aileron in the case in which the said aileron is not affected by the rotation of the corresponding wing.

Fig. 6 shows a modified form of an aileron control gear.

Figure 1:
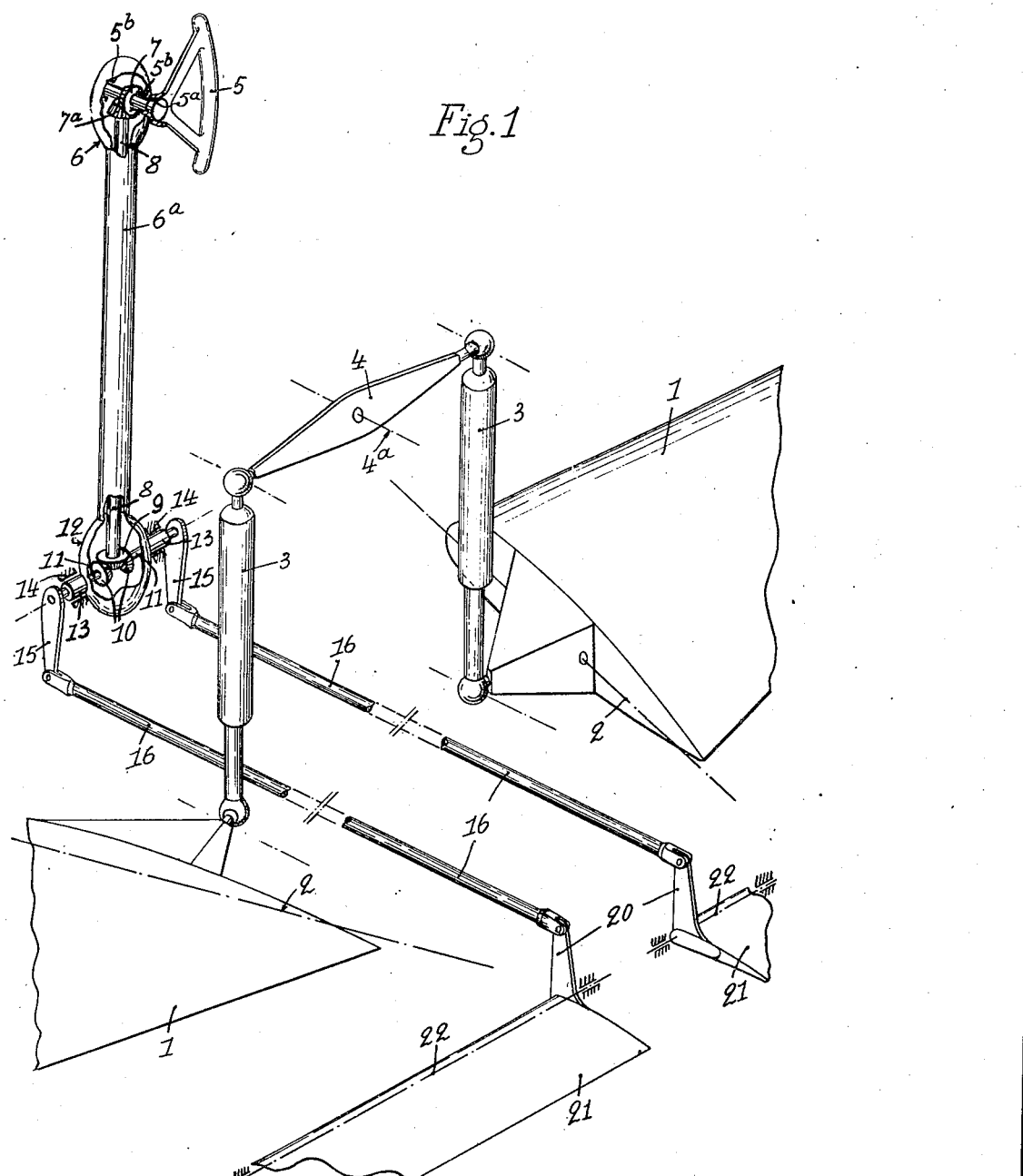
Fig. 1 is a perspective view of the control device for the elevator flaps.

In the embodiment shown in Fig. 1, there are represented at 1 two wings each of which is pivotally connected to the central body of the machine (not shown) for pivoting about an axis 2 which is oblique to the plane of symmetry of the machine, said wings being respectively connected by an elastic connection 3 to a two armed lever 4 rockable on a longitudinal axis 4ª. The control lever for elevation is in the present example, of the so-called "control wheel" type; the control-wheel 5 is keyed to a shaft 5ª which is journalled in bearings 5ᵇ secured to a casing 6. To the said shaft 5ª is keyed a bevel gear-wheel 7 meshing with a like wheel 7ª keyed to a shaft 8 rotatable in a tube 6ᵃ which extends the said casing. To the lower end of the shaft 8 is keyed a bevel gear-wheel 9 meshing with two bevel pinions 10 which form the two sun wheels of a differential mechanism. The pinions 10 are keyed to two shafts 11 situated in alignment. A case 12, secured to the tubular casing 6ᵃ, contains the entire differential mechanism and carries the bearings for the shafts 11. The outer cylindrical surfaces of said bearings form journals 13 which permit the whole casing (6, 6ᵃ, 12) to turn in two fixed bearings 14 carried by fixed parts of the flying machine.

To the ends of the shafts 11, and on either side of the journals 13, are keyed crank-arms 15, to the ends of which are pivoted the rods 16. The rods 16 are secured at the other end, either directly or through a transmission suitable for the flying machine in consideration, to the ends of crank-arms 20 which are rigidly secured to the flaps 21 of the elevator. Each of said flaps is rotatable on an axle 22 carried by fixed parts of the machine.

The operation of the device described is as follows. In order to incline the machine longitudinally, i. e. in order to make it "nose down" or "climb," the pilot, seizing the control wheel 5, swings the lever consisting of the casings 6, 6ᵃ and 12 forth or back about the bearing 14 while holding the control wheel in a fixed position with reference to the casings. This operation will turn the elevator flaps 21 upward or downward by means of the connection 5, 6, 6ᵃ, 12, 13, 15, 16, 20. In fact, as the pilot holds the control wheel in a given position with reference to the casings 6, 6ᵃ, 12, it will be observed that the device consisting of the shafts and gear-wheels 5ᵃ, 7, 7ᵃ, 8, 9, 10, 11, 15 will remain in a fixed position with reference to the said casings, which form the lever for pitch control. Moreover, whatever be the deflection of the flaps 21 with reference to each other (which differential deflection is obtained, as will be further stated, by a rotation of the control wheel relatively to the elevator control lever), the aggregate of these two flaps is turned at the same time and in the same direction when the pilot pushes or pulls the control wheel forth or back, respectively.

In order to incline the machine laterally in a given direction, the pilot turns the control wheel in this direction about the axis of the bearings 5ᵇ, thus causing the rotation of the shaft 8 and hence a differential deflection of the flaps 21 relatively to each other, through the medium of the connection 8, 9, 10, 11, 15, 16, 20; this differential deflection produces, upon the said flaps, differential aerodynamic effects which precisely tend to incline the machine in the desired direction.

It should be noted that the use of the differential deflection of the movable flaps forming the elevator on machines whose wings 1 are rotatable on oblique axes 2, has consequences which are of a novel character and are entirely different from what would be obtained upon the usual machines in which the wings are rigidly secured to the central body.

As a matter of fact, on these latter machines, the elevator is only used by turning its movable flaps in the same direction, in order to obtain the longitudinal inclination of the machine (nose-down or climb). The differential deflection of such flaps in order to obtain the lateral inclination of the machine would, if used alone, afford a torque which is much too small to overcome the anti-rotation torque due to the aerodynamic action exerted upon the wings (when the machine inclines laterally) in the direction opposed to this inclination. In order to provide for the lateral control of the usual machines, it is necessary, for this reason to employ a more effective method, and use is generally made of the differential deflection of movable flaps (ailerons) which are mounted on the wings themselves, thus obtaining a roll moment having a much greater value.

On the contrary, upon the machines in which the wings 1 are pivoted obliquely at 2 with reference to the direction of travel, and in which the position of the wings about their respective pivot axes is maintained by suitable elastic connections, the differential aerodynamic effects which are exerted upon the wings 1 when the machine makes a rolling movement, may be suitably limited by the even principle of the oblique hinges of the wings; as a matter of fact, if the obliquity of the pivot axis 2 of each wing is suitably chosen with reference to the direction of travel of the machine, the variation of incidence resulting from the automatic rotation of each wing about this axis (by the effect of the variation of the aerodynamic loads which it supports) takes place precisely in the proper direction for limiting this variation of loads.

It is also a known fact that with such machines, it is even possible to entirely annul the rolling moment resulting from differential aerodynamic actions exerted upon the wings, which annulment can be obtained by the rocking-lever device 3, 4 or by any other balancing device (for instance by means of elastic connections inserted between the wings and the central body of the machine and comprising means for automatically balancing their reactions).

In these conditions, it will be apparent that the differential pivoting of the elevator flaps 21 will permit, for such machines, of obtaining by itself alone, a satisfactory lateral control which could not be obtained with the usual machines. In fact, it is simply necessary to create a very small rolling moment in order to obtain the lateral inclination of the machine, as the differential aerodynamic actions which are exerted upon the wings and which oppose this inclination, may be automatically greatly reduced or even annulled upon such machines.

Moreover, the differential deflection of the elevator flaps will permit, for machines having pivoted wings as above set forth, of obtaining a rolling moment which is independent of the aerodynamic actions exerted upon the wings, and of thus maintaining all the advantages resulting from the oblique pivoting of the wings, and particularly the automatic limitation of the aerodynamic overloads (in agitated air or during heavy evolutions), and the automatic stabilization of the machine in the lateral direction.

The device for the differential deflection of the elevator flaps will obviously be applicable in all cases of mechanical control of the said flaps. The aforesaid example corresponded to the case of the utilization of a control lever of the control wheel type.

In the embodiment shown in Fig. 2, which is not of a limitative nature, the controlling lever is of the "control-stick" type.

The control-stick 31 is mounted on gimbals. It is rotatable on two perpendicular axes 32 and 33. The shaft having the axis 33 serves as a support and is rotatable in bearings 14 carried by fixed parts of the machine. The control stick carries at its lower end a socket 35 in which is pivoted the end of a lever 36 whose other end terminates in a fork rotatable about a transverse axis which is materialized by two pins 37. The said pins project from a sleeve 38 on which is secured a rocking-lever 39. The sleeve 38 and lever 39 which are integral are rotatable on a shaft 40, rigidly secured to a transverse shaft 41 rotatable in bearings 42 carried by fixed parts of the machine. Suitable stops such as 34 prevent the sleeves from sliding on shaft 40. The two ends of the lever 39 are provided with balls, on which are pivoted the two rods 16 which are pivoted at their other end, either directly or through the medium of a suitable transmission and by means of two further ball and socket joints, to the ends of two levers 20 secured to the elevator flaps 21. These two flaps can rotate on axles 22 carried by the machine.

It is to be understood that in this embodiment as well as in the other embodiments to be further described, the ball and socket joints existing in these examples can obviously be replaced by any other form of joint providing for the necessary freedom of movement (such as gimbal joints, joints with toric axes, simple joints having a sufficient play to allow the desired movements, etc.).

In these conditions, the operation of the device is as follows. For the longitudinal inclination of the machine, the pilot swings the control-stick 31 forth or back about the axis 33. This operation causes an upward or downward deflection of the elevator flaps 21, by means of the connection 31, 35, 36, 37, 38, 39, 16, 20.

For the lateral inclination of the machine in a given direction, the pilot swings the control-stick laterally in this direction, about the axis 32. This action turns the lever 36, and hence the sleeve 38, about the shaft 40, thus causing a differential deflection of the flaps 21 through the connection 38, 39, 16, 20, 21.

The device for the differential deflection of the flaps forming the elevator may be combined, as above stated, with a device for the differential deflection of movable flaps (ailerons) mounted on the wings, and such ailerons may be if desired affected by the automatic rotation of each wing about its pivot axis.

Fig. 3, which is given as an example of no limitative nature, illustrates the construction of such a combined device in the case in which the ailerons are affected by the rotation of the wings 1 on their pivot axes 2 (automatic differential action), whereby the said ailerons can moreover be controlled by the pilot if desired.

Fig. 4 corresponds to the same embodiment, and illustrates the details of the upper and lower part of the control lever, which is herein supposed to be of the control-wheel type.

The shaft 8 carries at its lower part, and below the pinion 9, a Cardan joint 43 whose centre is located on the common axis of the journals 13 and through which shaft 8, when rotating about its proper axis, can rotate another shaft 44 which extends outwardly of the casing 12 through a suitable aperture 45 and is rotatable in a fixed bearing 46. To the lower end of shaft 44 is keyed a crank-arm 47 on whose end is pivoted a rod 48. The other end of rod 48 is pivoted to one arm of a bell crank lever 49 which is rotatable about an axle 50 carried by fixed parts of the machine. To the end of the other arm of the lever 49 are pivoted (for instance by ball and socket joints) two rods 51 which are each pivoted at their other end (for instance by a ball and socket joint) to the end of a lever 52 rotatable on the pivot axles 2 of the wings 1. To the end of each lever 52 is also pivoted (for instance by a ball and socket joint) a rod 54 which is pivoted at the other end to one of the arms of a bell-crank lever 55 rotatable on an axle 56 carried by the corresponding wing 1 of the machine. To the other arm of the lever 56 there is pivoted a rod 57 which is pivoted at the other end to a crank-arm 58 secured to the aileron 59. Each aileron 59 is rotatable on an axle 60 carried by the corresponding wing 1 of the machine.

The control gear for the elevator flaps is the same as in the case of Fig. 1.

The operation of the said device is as follows. For the longitudinal inclination of the machine, the device operates as in the case of Fig. 1. Moreover, by means of the Cardan joint 43 and without any operation for lateral inclination (the control-wheel 5 being in its mean position and the corresponding direction of one of the perpendicular axes of the Cardan joint 43 being supposed to be parallel with the common axis of the journals 13), it will be observed that the operation of the elevator control lever (consisting of the casings 6, 6ᵃ, 12 and rotating in the bearings 14) will have no action upon the crank arms 47 and hence no action upon the ailerons 59.

For the lateral inclination of the machine, the pilot operates in the same manner as in the case of Fig. 1. But in the present case, the rotation of the shaft 8 causes on the one hand a differential deflection of the flaps 21 by means of the connection 8, 9, 10, 11, 15, 16, 20, 21, and on the other hand a differential deflection of the ailerons 59 by means of the connection 8, 43, 44, 47, 48, 49, 51, 54, 55, 57, 58, 59.

It is further possible to add to the device a clutch-release system under the pilot's control, which permits, for example, of making the crank-arm 47 loose on the shaft 44 and thus of making use or not, at will, of the combined controls for the differential deflection of the elevator flaps 21 and the ailerons 59; the said releasing device may also comprise means for locking the control gear controlling the ailerons 59, after it has been uncoupled from shaft 44.

The device shown in Fig. 3 further provides for a combined action of the wings 1 and of their ailerons 59, which has for its effect:

to restrict or annul the aerodynamic overloads supported by the wings;

to obtain an automatic stabilization of the machine in the lateral direction.

If it is supposed, in fact, that the right wing 1 is subjected to an overload in the upward direction, it will turn, by the action of this overload, in the direction of the arrow $f_1$, about the corresponding axis 2, and as the point of connection between the rod 54 and the lever 52 is not situated on the axis 2, this rotation will cause through the corresponding connection 54, 55, 57, 58, an upward deflection of the aileron 59 of this wing about its pivot axis 60. This rotation reduces the aerodynamic overload in consideration and hence increases the compensating action resulting from the rotation of the wing on its axis 2, which upward rotation has caused, owing to the suitable oblique position of the axis 2 relatively to the direction of travel of the machine, a variation of incidence which reduces the aerodynamic overload in consideration.

On the other hand, owing to the elastic connections 3 connecting the wings to the rocking lever 4, the upward rotation of the right wing 1 in the direction of the arrow $f_1$ is transmitted to the left wing 1 which turns downwardly in the direction of the arrow $f_2$, thus increasing its incidence. This rotation, owing to the corresponding connection 54, 55, 57, 58, causes a downward movement of the aileron 59 of the said wing. This automatic differential deflection of the ailerons which is due to automatic rotations, in contrary directions, of the wings by the action of unsymmetrical overloads, gives rise to an additional torque having the same direction as the torque which is due to the differential rotation of the wings, and which tends, together with the same, to counteract the rolling movement which is imparted to the machine by the unsymmetrical overload above mentioned.

In the case in which the wings are subjected to a symmetrical overload in the upward or downward direction, they will turn automatically at the same time in the direction of the application of the overload, and by reason of the connections 54, 55, 57, 58, the ailerons will turn simultaneously and automatically in this direction, about their axes 60, thus tending to increase the efficiency of the limitation of forces resulting from the variation of the incidence of the wings due to their rotation.

This method for the automatic deflection of the ailerons will particularly provide (when the wings turn downwardly on their respective pivot axles) for the automatic increase of the lifting force exerted upon the wings when in slow-speed flights, and the ailerons employed for this purpose can be specially designed for obtaining a greatly increased lifting power (lift-increasing devices).

It is observed that the same combined device (elevator flaps with controlled differential deflection, and ailerons with automatic differential deflection), may obviously be employed in all embodiments of the controlling device, and particularly in the case of the utilization of a control lever of the control-stick type.

Moreover, it is possible, as above stated, to make use of ailerons which are not affected by the rotation of the wings on their pivot axles and are controlled exclusively by the pilot.

Fig. 5 shows an example of the modification to be made to the lever 52 of Fig. 3 in order to obtain this result.

Each of the rods 51 (Figs. 3 and 5) is pivoted at one end (for instance by a ball and socket joint) to one arm of the bell-crank lever 49 (Fig. 3) and at the other end, to one end of a lever 70 (Fig. 5) which is rotatable on a fixed axle 71 whose axis meets the pivot axis 2 of the corresponding wing and is perpendicular to this axis. Each rod 54 is pivoted (for instance by a ball and socket joint) at one end of one arm of the bell-crank lever 55 (Fig. 3), and at the other end to the end of the corresponding lever 70 (Fig. 5). Moreover, each lever 70 is so arranged that in this mean position, the pivot axis 2 of the wing will pass through the centre of the ball and socket joint connecting the lever to the rod 54.

It is to be noted that in this case, the pivot joint between the rod 51 and the lever 70 must not necessarily be of the ball and socket joint type.

The operation of the device is as follows.

The lateral control of the machine (controlled differential deflection of the ailerons combined with the differential deflection of the flaps of the elevator) is effected as in the case illustrated in Fig. 3, the lever 52 being replaced by the lever 70. Moreover, as the points of connection between the rods 54 and the levers 70 are each located on the pivot axis 2 of the corresponding wing, for the mean position of the levers 70 corresponding to the non-deflected position of the ailerons, it will be seen that in this case, the said ailerons are not affected by the rotation of the wings on their axes.

The said device might also be constructed by securing each pivot axle 71 upon the corresponding wing (and not upon the central body of the machine); in this case, all the aforesaid indications regarding the ball and socket joint attaching each rod 54 to the corresponding lever 70, will apply to the joint between of each rod 51 and said lever 70 this joint being then of the ball and socket type for example). Obviously, the operation of this modification is the same as that of the last-mentioned device.

Fig. 6 shows a modified form of the mechanical control gear for the lateral control of the machine. The connection between the pilot's controlling lever and the rods 51, on the one hand, and between the rods 54 and the ailerons on the other hand, is of the same type as shown in Fig. 3. The modification is as follows. Each link 51 is pivoted to the end of an arm 80 which is rigidly secured to a shaft 81 rotatable in a bearing 82 carried by fixed parts of the machine. Suitable stops prevent said shaft from sliding within said bearing.

To the upper end of each shaft 81 is keyed a spur gear 83 engaging a rack of circular section which is formed in a cylindrical sleeve 84 slidable on the pivot axis 2 of the corresponding wing 1. To one end of the sleeve 84 is rigidly secured a member 85, which is formed with transverse guides for two slides 86, each of which is provided with a journal 87. To said journals are pivoted the two arms of a fork 88 formed at the end of one arm of a bell-crank lever 89 which is rotatable on an axle 90 rigidly secured to the wing. To the other arm of each lever 89 is pivoted the corresponding rod 54.

It will be appreciated that the system described provides for an absolute independence of the deflection of the ailerons and of the rotation of the wings about their respective pivot axes.

Obviously, the said invention is not limited to the embodiments herein described and represented, which are given solely by way of example.

Having now described our invention what we claim as new and desire to secure by Letters Patent is:

1. In a flying machine, the combination with a central body, of two supporting wings each of which is adapted to pivot relatively to said central body about an axis which is oblique to the longitudinal plane of symmetry of said central body, elastic means for normally maintaining the wings in a position of equilibrium, ailerons carried by said wings and an elevator carried by said central body and including two separate movable flaps, and control means including means adapted to selectively impart to said flaps either differential deflecting movements in opposite directions, or equal deflecting movements in the same direction, or differential deflecting movements in the same direction, and means for deflecting said ailerons.

2. In a flying machine, the combination with a central body, of two supporting wings each of which is adapted to pivot relatively to said central body about an axis which is oblique to the longitudinal plane of symmetry of said central body, elastic means for normally maintaining the wings in a position of equilibrium, ailerons carried by said wings and an elevator carried by said central body and control means adapted to selectively impart either differential deflecting movements in opposite directions to both said flaps and ailerons or deflecting movements in the same direction to said flaps only.

3. In a flying machine, the combination with a central body, of two supporting wings each of which is adapted to pivot relatively to said central body about an axis which is oblique to the longitudinal plane of symmetry of said central body, elastic means for normally maintaining the wings in a position of equilibrium, ailerons carried by said wings and an elevator carried by said central body and control means adapted to selectively impart either differential deflecting movements in opposite directions to both said flaps and ailerons, or deflecting movements in the same direction to said flaps only, said control means including an elongated casing pivoted at one end to said central body about a transverse axis perpendicular to the longitudinal plane of symmetry of the central body, a differential mechanism including two sun wheels rotatable about said transverse axis and connected in rotation to said flaps, a first shaft extending longitudinally of said casing and supported thereby, a planetary pinion meshing with said two sun wheels and keyed to said first shaft, a control wheel rotatably supported at the free end of said casing and connected in rotation to said first shaft, a second shaft normally in line with said first shaft and rotatably supported by said central body, an universal joint whose centre is located on said transverse axis for connecting together the adjacent ends of said first and said second shaft, and a control gear between said second shaft and said ailerons for deflecting said ailerons in opposite directions when said second shaft is rotated about its axis through said first shaft and said control wheel.

4. A flying machine as claimed in claim 3, in which said control gear is such that each aileron is further automatically deflected by the rotation of the wing by which it is carried about its pivot axis, the deflection taking place in the same direction as the rotation of the wing.

5. A flying machine as claimed in claim 3, in which said control gear comprises for each wing a control rod extending longitudinally of the wing, a connection between the inner end of said control rod and said second shaft for shifting said rod longitudinally when said second shaft is rotated, a connection between the outer end of said control rod and the corresponding aileron for deflecting said aileron when said control rod is shifted longitudinally, and a lever pivoted at one end about the pivot axis of the corresponding wings, said control rod being formed in two sections whose adjacent ends are pivoted to the other end of said lever, whereby the ailerons are automatically deflected when the wings pivot about their pivot axes.

6. A flying machine as claimed in claim 3, in which said control gear is such that the deflection of the ailerons is independent of the rotation of the wings about their pivot axes.

7. A flying machine as claimed in claim 3, in which said control gear comprises for each wing a control rod extending longitudinally of the wing, a connection between the inner end of said control rod and said second shaft for shifting said rod longitudinally when said second shaft is rotated, a connection between the outer end of said control rod and the corresponding aileron for deflecting said aileron when said control rod is shifted longitudinally, and a lever pivoted at one end about an axis perpendicular to and meeting the pivot axis of the corresponding wing, said control rod including an inner and an outer section whose adjacent ends are pivoted to the other end of said lever, the pivoting centre of the outer section of said rod being located on the pivot axis of the corresponding wing when the aileron is in a non-deflected mean position.

8. A flying machine as claimed in claim 3, further comprising means for uncoupling the control gear from said second shaft.

9. A flying machine as claimed in claim 3 further comprising means for uncoupling the control gear from said second shaft and means for simultaneously locking said control gear.

10. A device as claimed in claim 3, in which said control gear comprises for each wing a control rod extending transversely of the machine, a connection between the inner end of said control rod and said second shaft for shifting longitudinally said control rod when said second shaft is rotated, and a connection between the outer end of each control rod and the corresponding aileron for deflecting said aileron when said rod is shifted longitudinally, said last-mentioned connection including a sleeve slidable on the pivot axis of the corresponding wing and formed with circumferential rack teeth, a spur gear meshing with said rack, a connection between the outer end of said control rod and said spur gear for rotating said spur gear when said control rod is shifted longitudinally whereby said sleeve is displaced axially, and a connection between said sleeve and the corresponding aileron for deflecting said aileron when said sleeve is displaced axially.

ROGER LÉGER MARIE.
FERNAND ROUANET.
FRANÇOIS VICTOR ANDRÉ
JOSEPH REY.